Patented Mar. 10, 1953

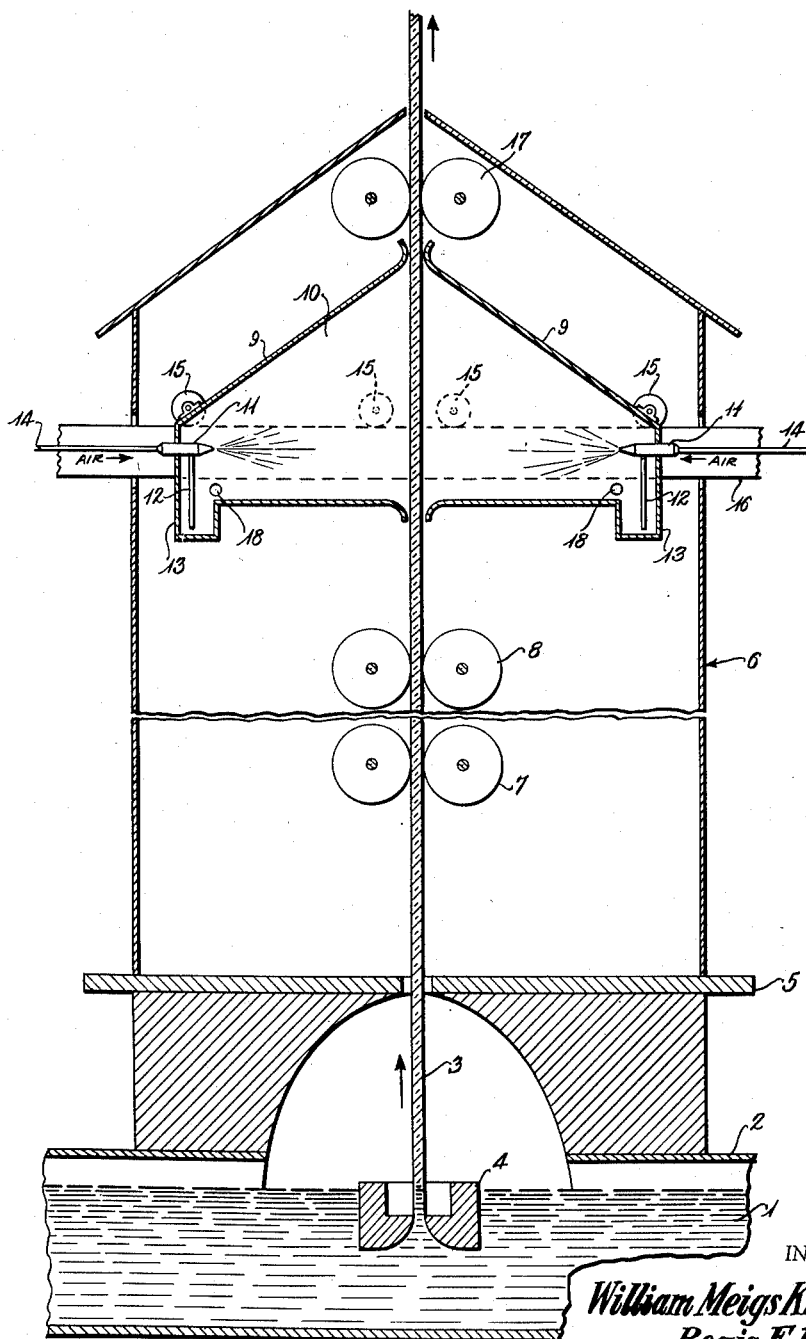

2,630,656

UNITED STATES PATENT OFFICE 2,630,656

CONTINUOUS SHEET GLASS DRAWING PROCESS

William Meigs Kramer, Clarksburg, W. Va., and Regis Florian Fey, Valencia, Pa., assignors to Adamston Flat Glass Company, Clarksburg, W. Va.

Application November 23, 1951, Serial No. 257,766

11 Claims. (Cl. 49—79)

This invention relates to a method for continuously drawing sheet glass. More particularly, the invention relates to a method for continuously drawing sheet glass of improved stability in storage.

Sheets of conventional glass, when stored in direct mutual contact under normal atmospheric conditions, undergo surface degradation in the contact area. Under average conditions of storage, such degradation so adversely affects the transparency and surface properties of the sheet glass as to render it unfit for use in the conventional manner. In extreme cases, sheets of glass stored in direct mutual contact may actually fuse together.

Prior to this invention, sheet glass producers have sought to obviate this degradation phenomena by interleafing glass sheets with materials intended to preclude the mutual contact of the surfaces of the sheets. In the early days of the industry, straw and hay were used for this purpose. More recently, various types of paper, wood flour, and similar materials have been so employed.

These expedients of the prior art are not entirely satisfactory. The interleafing material utilized must be stable under the conditions to which the sheet glass may be subjected in storage and transportation. Furthermore, the interleafing material must be characterized by a pH falling within a narrow range, to preclude an adverse effect upon the glass, which may be as serious as that resulting from the mutual contact of the glass surfaces in the absence of an interleafing material.

Additionally, it has been found impractical in the industry to interleaf strip glass of certain sizes, and, as a consequence, mutually contacting surfaces of such strip glass have been exposed to the degradation hazard during storage and shipment.

Sheet glass is conventionally drawn as a continuous ribbon from a mass of molten glass. The interleafing operation is collateral to the primary sheet glass drawing process and must be accomplished manually. It is obvious that the improvement of this continuous sheet glass drawing process to produce glass which is not appreciably subject to degradation phenomena would eliminate the expensive interleafing operation and hence significantly advance the frontiers of the science of sheet glass manufacture.

It is accordingly a primary object of the invention to provide a method for continuously drawing a glass sheet which may be stored without appreciable surface degradation, in direct mutual contact with other glass sheets, although no conventional interleafing material is employed.

It is a further primary object of the invention to provide a process integral with conventional continuous sheet glass drawing operations for the continuous production of sheet glass having improved surface stability when stored in mutual contact with other glass surfaces.

It is an additional object of the invention to provide, in a continuous glass sheet drawing process, a method of treating the opposed surfaces of the continuously drawn glass sheet to preclude appreciable surface degradation of lights produced from the glass sheet when stored in mutual contact.

It is another object of the invention to obviate the necessity for interleafing glass sheets.

The invention embraces a continuous sheet glass drawing process for the production of sheet glass having improved surface stability which comprises forming a mass of molten glass, drawing a continuous glass sheet from said mass, cooling the surface of said continuous sheet to a temperature of about 100° F. to about 400° F., passing the so-cooled continuous glass sheet, while the temperature of the surface thereof is within the range of about 100° F. to about 400° F., through an atmosphere containing at least about 1000 p. p. m. of a solution, in a chlorinated hydrocarbon solvent, of an organosilicon compound selected from the group consisting of the hydrolyzable chlorosilanes and bromosilanes containing at least one alkyl radical having eight or more carbon atoms bonded directly to a silicon atom, the hydrolysis products of said silanes and the polymerized hydrolysis products of said silanes; to produce a polysiloxane film on a surface of said continuous glass sheet, and thereafter dividing said continuous glass sheet into lights of desired size, said solution containing from about 0.02% to about 2.0% by weight of said organosilicon compound, said atmosphere containing water in an amount requisite to effect at least partial hydrolysis, under the conditions, of any silanes present, the period of residence in said atmosphere of a point on said continuous sheet being from about 2 to about 120 seconds.

It will be appreciated by those skilled in the art that the treatment of a continuously drawn glass sheet must be such as to preclude the deposition of a coating of any substantial thickness on the glass surface. If this precaution is not observed, the glass may be rendered unfit for the primary purpose for which it was intended, unless it be freed of the coating prior to utilization. In this event, the market for the treated glass would be substantially reduced and the advantages otherwise flowing from the invention largely dissipated. It is therefore critical that the polysiloxane film produced on the surface of the glass be extremely thin. Indeed, an essentially monomolecular layer is satisfactory. In practice, however, it may be expected that a film several molecules in thickness will be deposited on the glass surface.

It is additionally critical that the polysiloxane film which is formed on the glass surface as a result of the glass drawing process of this invention be sufficiently adherent thereto to insure the presence of the film on the glass surface throughout the normal storage period.

It is additionally critical that the polysiloxane film deposited upon the glass surface by the glass drawing process of this invention be generally uniform throughout the area of the glass surface to which it is applied.

To effect the production on the continuous sheet glass surface of the uniform, extremely thin, strongly adherent polysiloxane films which are essential to the success of this invention, it is critical that the conditions under which the film is deposited be carefully controlled. To this end, the various interrelated factors which determine the nature of the film produced must be restricted to the hereinafter defined ranges.

It is initially critical that the hydrolyzable silicon compound or the hydrolysis product thereof which is employed be utilized in the form of a solution in a halogenated hydrocarbon solvent. Efforts to apply the hydrolyzable silicon compounds in the form of vapors introduced into heated chambers or otherwise have proved unsatisfactory and infeasible for the reason that a nonuniform polysiloxane film is produced. Such processes result in the formation of polysiloxane films which are not continuous throughout the glass surface and which may be unduly thick in various areas.

It is critical that a halogenated hydrocarbon be employed as a solvent, in view of the high temperature conditions which exist in the glass sheet producing process. The utilization of flammable materials such as toluene and benzene is not feasible. The preferred halogenated hydrocarbon solvent is trichloroethylene. Trichloroethylene is preferred for the reason that it is nonflammable, has a low toxicity, and is characterized by a boiling point within the most desirable range for utilization in the invention. Other halogenated hydrocarbon solvents which may be employed include carbon tetrachloride, dichloroethylene, perchlorethylene, chlorinated propanes, chlorinated aromatic hydrocarbons of appropriate boiling point, and the like.

It will be appreciated by those skilled in the art that the solvent employed must have a vapor pressure, under the conditions of utilization, which is greater than that of the silicon compounds which constitute the solute. It is preferred, for the purposes of this invention, that the halogenated hydrocarbon solvent employed have a boiling point within the range of about 70° F. to 250° F.

It is additionally critical to the practice of this invention that the solution of the organosilicon compound employed contain from about 0.02% to about 2.0% by weight of the organosilicon compound. If the lower limit of this range is exceeded, the film produced is discontinuous or deficient in permanency. If the upper limit of the above specified range for the concentration of the organosilicon compound in the solution is exceeded, films of excessive thickness may be produced. Furthermore, the utilization of solutions of greater concentration results in the waste of treating material and is therefore unnecessary and expensive.

It is additionally critical that the solution of the organosilicon compound employed be applied to the continuous glass sheet in the form of a vapor or mist. Preferably the solution is applied in the form of a mist of finely divided liquid particles such as that which may be produced by atomization or aspiration. The utilization of the solution in true gaseous or vapor form is less desirable, for the reason that the uniformity of the film produced thereby is inferior to that which results from the utilization of the solution in atomized form.

The application of the solutions of the organosilicon compounds to the surface of the continuous glass sheet by dipping or swabbing is infeasible and impractical and cannot be used in the practice of this invention, for the reason that nonuniform films having, at least in some areas, an undue thickness are thereby produced.

It is additionally critical to the success of the invention herein described that the atmosphere through which the continuous glass sheet is passed in the drawing process contain at least about 1000 p. p. m. of the solution of the organosilicon compound to insure the deposition of a film of appropriate uniformity and continuity. A preferred range of concentration of the vapor or mist of the solution in the atmosphere is from about 2500 to about 5000 p. p. m. by volume, a concentration in the range of about 3000 to 3500 p. p. m. being especially suitable. Concentrations throughout the range of 1000 to 10,000 p. p. m. are contemplated by the invention.

It is additionally critical that the organosilicon compound employed be one which, under the conditions, is capable of depositing a polysiloxane film upon the surface of the glass sheet. More specifically, this invention embraces the use of chlorosilanes and bromosilanes containing at least one alkyl radical having at least eight carbon atoms bonded through carbon directly to a silicon atom. The alkyl radical may be saturated or unsaturated, cyclic or acyclic, and may contain substituents such as halogens and the like which do not enter into the hydrolysis and polymerization reactions which occur in the process of this invention. The silanes employed in this invention are accordingly derivatives of $SiH_4$ which contain alkyl groups and readily hydrolyzable halogen radicals bonded directly to the silicon atom. Specifically, examples of suitable organosilicon compounds include dioctylsilicon dichloride, decylphenylsilicon dibromide, dodecylsilicon trichloride, octodecylsilicon trichloride, hexadecylsilicon dichloride, 5-chlorotetradecylsilicon dibromide, nonylcyclohexylsilicon dichloride, and the like. The preferred class of hydrolyzable silicon compounds embraces the alkyl silicon trichlorides in which the alkyl radical is saturated and contains from 12 to 18 carbon atoms. Dodecyl, hexadecyl and octadecyl silicon trichloride are specifically preferred.

These compounds, under the conditions defined for the process of this invention, undergo hydrolysis with the result that hydroxyl groups are substituted for all or a part of the halogen atoms to produce the corresponding hydroxysilicanes or silicols. These materials, under the conditions, condense to form polymers which contain one or more pairs of silicon atoms which are bonded through an oxygen atom. That is, the hydroxysilicanes condense to form polysiloxanes. These hydrolytic and condensation reactions are believed to occur, at least in part, on the surface of the continuous glass sheet undergoing treatment. While dihalosilanes and trihalosilanes are required starting materials for the production of polysiloxane polymers, it will be appreciated that some monohalosilanes may be present to function as polymer chain breaking agents and the like.

There may be employed, in lieu of the chloro- and bromosilanes above described, hydrolysis products thereof, including the hydroxysilicanes or silicols and the polymers of hydroxysilicanes.

It is further critical to this invention that the atmosphere through which the continuous glass sheet is passed contain water in an amount requisite to effect at least partial hydrolysis of any halosilanes which may be present so that the reactions incident to the production of the polysiloxane film on the surface of the glass may take place. Normally, atmosphere having a relative humidity of about 30% is satisfactory, with the preferred starting material embracing the chloro- or bromosilanes. A preferred range of relative humidity is from about 5% to about 90%.

It is additionally critical that the continuous glass sheet which is treated in accordance with the method of this invention be set up after formation from the molten mass of glass from which it is produced and cooled to a temperature within the range of from about 100° F. to about 400° F., and that the continuous glass sheet be passed through the atmosphere containing the organosilicon compound solution while the surfaces of the sheet are within this temperature range. If the lower limit of the temperature range is not observed, a satisfactory bonding of the polysiloxane film to the surface of the sheet may not be achieved. Furthermore, the formation of the polysiloxane polymer may be incomplete and the resulting film therefore inferior. The upper temperature is that requisite to preclude decomposition of the organosilicon compounds and polymers which are utilized and produced in the practice of the invention. A preferred range of temperature of the surface of the glass sheet under gassy treatment is from about 225° F. to about 325° F.

It is additionally critical that the period of residence of a point on the continuous glass sheet within the atmosphere containing the solution of the organosilicon compound be from about 2 to about 120 seconds. The lower limit of this time range is critical to insure the formation of an adequate film of polysiloxane resin on the surface of the sheet and to effect the proper bonding of the film to the glass sheet surface. If the glass sheet remains within the atmosphere containing the solution of the organosilicon compound for a period of more than about 120 seconds, a film of undue thickness may be deposited upon the glass surface. A preferred period of residence as above defined is from about 10 to about 90 seconds.

A salient feature of the invention resides in the fact that it constitutes an improvement which is integral with conventional continuous sheet glass drawing operations.

Referring now, in detail, to the drawing, it will be observed that there is shown schematically in transverse section a conventional continuous glass sheet drawing apparatus embracing as an integral element thereof means designed to effect the production of a polysiloxane film on the surface of the continuously drawn glass sheet.

In the practice of the process of this invention a mass of molten glass 1 is in the drawing chamber 2. In conventional manner, a continuous glass sheet 3 is drawn upwardly from the mass of molten glass 1. The continuously moving glass sheet 3 moves from the drawing block 4 through the base 5 of the continuous glass sheet drawing apparatus indicated generally at 6, and then upwardly to the spaced pairs of rollers 7 and 8. It will be appreciated by those skilled in the art that pairs of rollers 7 and 8 are merely representative of the plurality of such roller pairs present in conventional sheet glass drawing apparatus.

Disposed within the sheet drawing apparatus 6 are identical movable members 9 adapted to form, when in operative juxtaposed position as shown in the figure, a chamber indicated generally at 10 and to produce within said chamber an appropriate atmosphere containing a solution, of the above-described type, of an organosilicon compound in a chlorinated hydrocarbon solvent.

It will be observed that each of the movable members 9 is appropriately provided with a nozzle 11 having a syphon tube 12 extending into a solution reservoir 13. Each of the nozzles 11 is also connected through a line 14 to a controlled source of compressed air not shown.

Each of the members 9 is provided with wheel means 15 in operative engagement with track 16 to permit movement of the members 9 out of operative position.

In operation, air is passed through the nozzles 11, thereby effecting aspiration of the solution contained in reservoirs 13 into the chamber 10. The continuous glass sheet 3 is drawn from the upper pair of rollers 8 into the chamber 10 and thence through the atmosphere within the zone 10 which contains the aspirated solution of the organosilicon compound. The solvent present in the aspirated solution is volatilized substantially upon contact with the hot surface of the continuous glass sheet 3. The organosilicon compound forms on the surface of the glass sheet a polysiloxane resin film of the type and in the manner hereinbefore described. The so-treated sheet then emerges from the chamber 10 containing the organosilicon compound and passes upwardly between the third pair of rollers 17 and is thereafter cut to sheets of appropriate dimension.

It will be observed that, as shown in the drawing, the nozzles 11 are so disposed as to preclude direct impingement of the spray evolved therefrom upon the surface of the hot, continuous glass sheet. This expedient embraces the preferable mode of operation and serves to preclude the formation of nonuniform films.

It will be further observed that the members 9 are so constructed that the treated glass sheet does not come in contact therewith upon emergence from the treating zone. It has been found that it is highly desirable to practice the process in this manner to preclude mutilation of the freshly produced glass film.

The process of the invention desirably includes the step of recovering the solvent vapor from the chamber formed by the members 9, condensing the recovered vapor and recirculating the same to the system. In this manner, significant economies are effected and hazards due to excessive quantities of volatilized solvent in the glass manufacturing plant are avoided. Suitable outlet means 18 are provided on each of the members 9 which may be appropriately connected to an adequate solvent recovery system.

*Example I*

A molten mass of glass formulated according to a conventional recipe, containing essentially the following ingredients; based, in the conventional manner, on the proportions of oxides present:

| | |
|---|---|
| $SiO_2 = 72\%$ | $MgO = 2.5\%$ |
| $Al_2O_3 = 1.5\%$ | $Na_2O = 15.5\%$ |
| $CaO = 8.5\%$ | | was formed in the container 2. A continuous sheet as shown at 3 of about 0.2 in. thickness was then drawn from this molten mass and passed upwardly between the spaced rollers 7 and 8 and into the chamber 10 created by the members 9. Prior to entry into the chamber 10 created by the members 9, the surface of the glass was cooled to a temperature of about 200° F. By means of the aspirating nozzles 11 there was provided within the chamber 10 an atmosphere having a relative humidity of about 20% and containing about 3000 p. p. m. of a solution containing about 0.15% by weight of hexadecylsilicon trichloride in trichloroethylene. The rate of passage of the continuous glass sheet through the chamber 10 was so regulated that the period of residence of a point upon the glass sheet within the chamber 10 was about 60 seconds. The so-treated glass sheet was then passed out of the chamber 10 and upwardly between the rollers 17 and thereafter cut into sheets of desired size.

Sheets of the glass so produced were stored, with the lateral surfaces thereof in direct mutual contact, under normal atmospheric conditions for a period of about twelve months. No appreciable surface degradation was observable at the end of this time. In contrast with this result, ordinary untreated glass sheets, when stored in similar manner, demonstrated surface degradation to an extent such that they could not be utilized for normal commercial purposes.

*Example II*

The process as described in Example I was repeated, with the exception that in this instance the atmosphere through which the continuous glass sheet which was about 0.25 inch in thickness was passed contained about 10,000 p. p. m. of a solution of dodecyltrichlorosilane in perchloroethylene and the concentration of the silane in the solution was about 0.1%. The period of residence in the chamber 10 was about 120 seconds. Likewise in this example, the minimum temperature of the continuous glass sheet, while passing through the organosilicon compound containing atmosphere, was about 300° F. A product having properties similar to that of the product of Example I was obtained.

*Example III*

The process as described in Example I is repeated, with the exception that the solution employed contains about 0.02% of octyltribromosilane in trichloroethylene, and the minimum temperature of the glass sheet, while in contact with the atmosphere containing the silane, is about 100° F. A product having properties of surface stability comparable to those of the product of Example I is obtained.

*Example IV*

The process of Example I is repeated, with the exceptions that a glass sheet about 0.09 inch in thickness is drawn and that a solution containing about 2.0% of hexadecyltrichlorosilane in carbon tetrachloride was employed, and the minimum temperature of the glass sheet while in contact with the solution containing atmosphere is about 375° F. The period of residence of a point on the sheet in the chamber 10 is about 2 seconds. The product so obtained was analogous to that resulting from the process of Example I.

*Example V*

The process of Example I is repeated with the exception that a silicol composition resulting from the hydrolysis of tetradecyltrichlorosilane is employed. A product analogous to that resulting from the process of Example I is obtained.

*Example VI*

Example V is repeated with the exception that a polymerized product of the silicol material used in Example V is employed. This polymerized product contains siloxane resins which are predominantly dimers and trimers. A product analogous to that resulting from the process of Examples I and V is obtained.

It will be appreciated that this invention is not restricted by the composition of the glass sheet to which it is applied. Glass sheets of any desired composition are embraced by this invention. Thus, glass sheets containing materials such as dolomite, aluminum oxide or feldspar, carbon, arsenic or arsenic oxide, and the like may be continuously drawn in a sheet form in accordance with the method of the invention.

Reference is made to application Serial No. 220,070, filed April 9, 1951, which discloses a related invention, in which there is utilized an 0.05% solution of hexadecyltrichlorosilane and trichloroethylene.

We claim as our invention:

1. A continuous sheet glass drawing process for the production of sheet glass having improved surface stability, which comprises forming a mass of molten glass, drawing a continuous glass sheet from said mass, cooling the surfaces of said continuous glass sheet to a temperature of about 100° F. to about 400° F., passing the so-cooled continuous glass sheet, while the temperature of the surface thereof is within the range of about 100° F. to about 400° F., through an atmosphere containing at least about 1000 p. p. m. by volume of a solution in a chlorinated hydrocarbon solvent of an organosilicon compound selected from the group consisting of the hydrolyzable chlorosilanes and bromosilanes, having at least one alkyl radical containing at least 8 carbon atoms bonded directly to the silicon atom, the hydrolysis products of said silanes and polymers of said hydrolysis products to produce a polysiloxane film on the surface of said continuous glass sheet, and thereafter cutting said continuous sheet into sheets of desired size, said solution containing from about 0.02 to about 2.0% by weight of said organosilicon compound, the period of residence of a point on said continuous sheet within said atmosphere being from about 2 to about 120 seconds, the said atmosphere containing water in an amount sufficient to effect at least partial hydrolysis of any silanes present.

2. The process of claim 1 wherein the chlorinated hydrocarbon solvent employed is trichloroethylene.

3. The process of claim 1 wherein the organosilicon compound is hexadecylsilicon trichloride.

4. The process of claim 1 wherein the organosilicon compound is dodecylsilicon trichloride.

5. The process of claim 1 wherein the minimum temperature of the surfaces of the glass sheet, within the atmosphere containing the solution of the organosilicon compound, is from about 225° F. to about 325° F.

6. The process of claim 1 wherein the period of residence of a point on the continuous glass sheet, within the atmosphere containing the organosilicon compound, is from about 10 to about 90 seconds.

7. The process of claim 1 wherein the solution of the organosilicon compound is present in the atmosphere through which the continuous glass sheet is passed in the form of finely divided liquid particles.

8. The method which comprises treating the opposed surfaces of a continuous glass sheet before said sheet is cut into lights and while said continuous sheet is being delivered from a glass drawing machine by continuously passing said surfaces through an atmosphere containing a solution of about 0.02% to about 2.0% by weight of hexadecyltrichlorosilane in trichloroethylene to deposit a substantially molecular layer of said silane on said surfaces, said layer reacting with atmospheric moisture to form a silicone effective to protect said surfaces during shipment and storage thereof.

9. The method of claim 8 wherein the solution of hexadecyltrichlorosilane in trichloroethylene contains 0.05% of hexadecyltrichlorosilane.

10. The process of claim 1 wherein the organosilicon compound is octadecylsilicon trichloride.

11. The process of claim 3 wherein the chlorinated hydrocarbon solvent employed is trichloroethylene.

WILLIAM MEIGS KRAMER.
REGIS FLORIAN FEY.

REFERENCES CITED

The following references are of record in the file of this patent:

UNITED STATES PATENTS

| Number | Name | Date |
|---|---|---|
| 1,680,227 | Mambourg | Aug. 7, 1928 |
| 2,177,000 | Nash | Oct. 24, 1939 |
| 2,306,318 | Owen | Dec. 22, 1942 |
| 2,413,050 | Hyde | Dec. 24, 1946 |
| 2,439,689 | Hyde | Apr. 13, 1948 |
| 2,445,572 | Gerould et al. | July 20, 1948 |